UNITED STATES PATENT OFFICE.

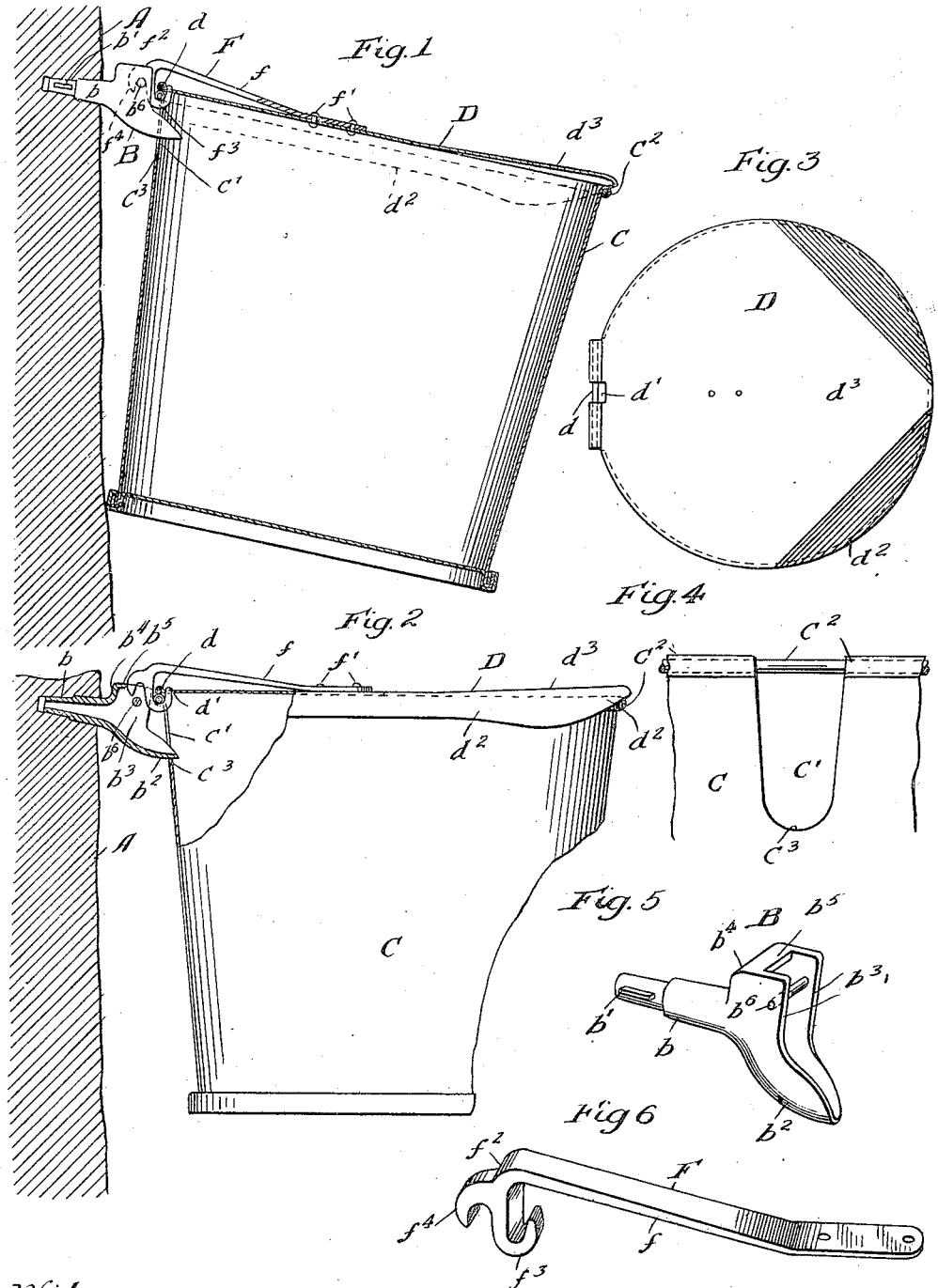

JOHN F. O'CONNOR, OF CHICAGO, ILLINOIS, ASSIGNOR TO WILLIAM H. MINER, OF CHICAGO, ILLINOIS.

SAP-COLLECTOR.

No. 887,012.      Specification of Letters Patent.      Patented May 5, 1908.

Application filed February 13, 1908. Serial No. 415,652.

*To all whom it may concern:*

Be it known that I, JOHN F. O'CONNOR, a citizen of the United States, residing in Chicago, in the county of Cook and State of Illi5 nois, have invented a new and useful Improvement in Sap-Collectors, of which the following is a specification.

My invention relates to improvements in sap collectors.

The object of my invention is to provide a sap collecting spout and vessel of a strong, simple, efficient and durable construction, capable of being cheaply manufactured, in which the vessel may be securely supported directly from the spout, and easily and quickly removed therefrom when it is desired to empty the vessel, and in which the cover of the vessel will be snugly and firmly clamped upon the collecting vessel so that it will not be raised or displaced by wind or animals.

My invention consists in the means I employ to practically accomplish this object or result. That is to say, it consists in a spout, preferably of cast metal, adapted to be driven into a suitable hole of a maple or other tree, and furnished with a projecting lip adapted to enter an opening in the side of the vessel near its rim, and furnished with upwardly projecting sides or guide ears for the cover clamping and vessel supporting clamp hook or device, and a pivot for engaging said cover clamping and vessel supporting hook, in combination with a collecting vessel and cover therefor, and a cover clamping and vessel supporting clamp hook, preferably of cast metal, and riveted or otherwise rigidly secured to the cover at its central portion so that the spring of the sheet metal cover will enable the hook end of the clamp hook to be depressed slightly when it is desired to disengage the clamp hook from the vessel, said clamp hook being furnished at its hook end with a hook for pivotally engaging the rim of the vessel and its cover, and also with a further hook for pivotally engaging the pivot of the spout.

The invention further consists in the novel construction of parts and devices and in the novel combinations of parts and devices herein shown and described.

In the accompanying drawing, Figure 1 is a central vertical sectional view of a sap collector embodying my invention. Fig. 2 is a detail, partial sectional view showing the vessel and cover in position for disengagement of the clamp hook from the spout. Fig. 3 is a detail plan view of the cover with the clamp hook removed. Fig. 4 is a detail rear elevation of the vessel with the cover and clamp hook removed. Fig. 5 is a detail perspective view of the spout. Fig. 6 is a detail perspective view of the clamp hook.

In the drawing, A represents a maple or other tree, the sap of which is to be collected.

B is a spout, C the collecting vessel or pail, D the cover and F the clamp hook.

The spout B is preferably of cast iron or other suitable metal, and is furnished with a tapering tubular portion $b$ adapted to be driven securely into the tree, and preferably furnished with wings $b^1$, and with a downwardly extending lip $b^2$ adapted to project inside the vessel C through a suitable opening $C^1$ therein near its top and just below the wired rim $C^2$, this lip clearing at its lower portion the lower edge $C^3$ of the spout opening in the vessel. The spout $b$ is further furnished with a housing portion to receive the hook end of the clamp hook, this housing preferably comprising upright sides or ears $b^3$, $b^3$ and a back portion $b^4$ having an overhanging lip $b^5$ at its top. The spout B is further furnished with a pivot $b^6$ extending between its upright sides or pivot ears. This pivot may preferably be in the form of a separate pin riveted to the spout.

The pail or vessel C may be of any suitable form or construction, but is preferably of galvanized iron or other sheet metal, and it is provided with a spout opening $C^1$ near its upper edge as above mentioned.

The cover D may be of any suitable form or construction. It is preferably of sheet metal, and is provided at its rear edge with a hinge wire $d$ and a hook opening or notch $d^1$ to receive the lip or end of the vessel supporting hook of the clamp hook F. The cover D is preferably also furnished with a depending flange or rim $d^2$ adapted to embrace a portion of the collecting vessel C and with an upwardly projecting middle portion $d^3$ at its front or opposite the clamp hook so that the cover will not interfere with the convenient pouring of the sap from the vessel C when the vessel C is removed from the tree. This construction of the cover enables the sap to be conveniently poured from the vessel without removing the cover from the vessel. Instead of providing the vessel C with a pouring lip or portion, I prefer to provide the cover with an upward bend or projection, as this cheapens the construction of the device as a whole and also leaves the vessel C of a strong and more regular shape.

The clamp hook F comprises a bent shank portion $f$, rigidly secured at its extreme end to the middle portion of the cover D in any suitable manner, but preferably by a couple of rivets $f^1$. The bend $f^2$ of the shank of the clamp hook causes the hook end thereof to normally stand or project somewhat above the cover, the spring of the sheet metal of the cover enabling, however, the hook end to be sufficiently depressed to permit its vessel supporting hook $f^3$, which hooks around the hinge pin or rim $C^2$ of the vessel to be sufficiently depressed for disengagement of the vessel from the cover when that is desired. The clamp hook is provided at its hook end with two hooks, an outer downwardly opening one $f^4$ for engagement with the pivot projection or pin of the spout and an inner upwardly opening hook $f^3$ which hooks over the rim wire or other hinge or supporting attachment of the vessel C.

As the clamp hook F is attached rigidly to the cover and as it is supported or pivotally connected to the spout at its extreme end, and as the vessel C is supported from the clamp hook at an intermediate point, it will be readily understood that in my invention, the weight of the vessel by reason of the lever action of the clamp hook necessarily and constantly tends to clamp or compress the cover snugly down upon the vessel and thus hold the cover securely in position by the weight of the vessel and its contents.

I claim:—

1. In a sap collector, the combination with a collecting vessel, a cover therefor, a spout having a lip projecting into the vessel and a pivot for engagement with a cover clamping and vessel supporting clamp hook, and a cover clamping and vessel supporting clamp hook secured rigidly to the cover and having at its hook end two hooks, one for engagement with the spout and the other for engagement with the vessel, whereby the weight of the vessel serves to clamp the cover on the vessel, substantially as specified.

2. In a sap collector, the combination with a collecting vessel, a cover therefor, a spout having a lip projecting into the vessel and a pivot for engagement with a cover clamping and vessel supporting clamp hook, and a cover clamping and vessel supporting clamp hook secured rigidly to the cover and having at its hook end two hooks, one for engagement with the spout and the other for engagement with the vessel, whereby the weight of the vessel serves to clamp the cover on the vessel, said clamp hook having a bent shank so that the spring of the cover will hold the vessel in secure engagement with one of the hooks of the clamp hook and permit disengagement of the vessel from the cover when desired, substantially as specified.

3. In a sap collector, the combination with a collecting vessel, a cover therefor, a spout having a lip projecting into the vessel and a pivot for engagement with a cover clamping and vessel supporting clamp hook, and a cover clamping and vessel supporting clamp hook secured rigidly to the cover and having at its hook end two hooks, one for engagement with the spout and the other for engagement with the vessel, whereby the weight of the vessel serves to clamp the cover on the vessel, said vessel having an opening at one side near its top to receive the spout and a hinge member to engage one of the hooks of the clamp hook, substantially as specified.

4. In a sap collector, the combination with a collecting vessel, a cover therefor, a spout and a clamp hook secured to the cover, and having one hook engaging the spout and another hook engaging the vessel, substantially as specified.

5. In a sap collector, the combination with a collecting vessel, a cover therefor, a spout and a clamp hook secured to the cover, and having one hook engaging the spout and another hook engaging the vessel, said cover having an upwardly bent portion at its front edge to enable the sap to be poured from the vessel without removing the cover, substantially as specified.

6. In a sap collector, the combination with a collecting vessel, a cover therefor, a spout and a clamp hook secured to the cover, and having one hook engaging the spout and another hook engaging the vessel, said spout having a projecting lip and a housing furnished with a pivot for engaging the outer hook of the clamp hook, substantially as specified.

7. In a sap collector, the combination with a collecting vessel, a cover therefor, a spout and a clamp hook secured to the cover, and having one hook engaging the spout and another hook engaging the vessel, said clamp hook having a bent shank secured at its end to the middle portion of the cover, substantially as specified.

8. In a sap collector, the combination with a collecting vessel, a cover therefor, a spout and a clamp hook secured to the cover, and having one hook engaging the spout and another hook engaging the vessel, said vessel having an opening near its upper edge or rim to receive the inner hook of the clamp hook, substantially as specified.

9. A sap collector comprising a vessel, a cover, a spout and a clamp hook secured to the cover and furnished with an outer downwardly opening hook adapted to engage the spout and an inner upwardly opening hook adapted to engage the vessel, substantially as specified.

10. A sap collector, comprising a vessel, a cover, a spout and a clamp hook secured to the cover and furnished with an outer downwardly opening hook adapted to engage the spout and an inner upwardly opening hook adapted to engage the vessel, said clamp hook having a bent shank, substantially as specified.

11. A sap collector, comprising a vessel, a cover, a spout and a clamp hook secured to the cover and furnished with an outer downwardly opening hook adapted to engage the spout and an inner upwardly opening hook adapted to engage the vessel, said clamp hook having a bent shank, and said spout having a projecting lip and a housing furnished with a pivot for engagement with the outer hook of the clamp hook, substantially as specified.

12. A sap collector, comprising a vessel, a removable cover, a spout and a connecting device rigidly secured to the cover for supporting the vessel from the spout through the cover and causing the weight of the vessel and its contents to hold the cover closed, said connecting device having a pivotal connection with the spout and also with the vessel substantially as specified.

13. The combination with a sap collecting vessel, of a cover therefor, a spout and a connecting device rigidly secured to the cover for supporting the vessel from the spout through the cover, said connecting device having a pivotal connection with the spout and also with the vessel substantially as specified.

14. The combination with a sap collecting vessel and its cover, of a supporting device for the vessel rigidly secured to the cover, and having pivotal means for engaging the vessel, said supporting device having also means for pivotal engagement with the spout, substantially as specified.

15. A cover and clamp hook having a bent shank secured to the cover and provided with a hook for engaging the vessel, and a further hook for engaging a spout or other device, substantially as specified.

16. The cover and clamp hook F having a bent shank $f$ secured to said cover and provided with two hooks, one for engagement with the rim of a vessel and the other for engagement with a spout, substantially as specified.

17. The cover and clamp hook F having at one end an upwardly opening hook and a downwardly opening hook and a shank secured to said cover, substantially as specified.

JOHN F. O'CONNOR.

Witnesses:
 H. M. MUNDAY,
 PEARL ABRAINS.